(12) United States Patent
Andersson et al.

(10) Patent No.: US 12,500,046 B2
(45) Date of Patent: Dec. 16, 2025

(54) MECHANISM FOR ELECTRICAL DEVICE

(71) Applicant: ABB S.p.A., Milan (IT)

(72) Inventors: Anna Andersson, Västerås (SE); Erik Johansson, Västerås (SE); Su Zhao, Västerås (SE)

(73) Assignee: ABB S.p.A., Milan (IT)

( * ) Notice: Subject to any disclaimer, the term of this patent is extended or adjusted under 35 U.S.C. 154(b) by 751 days.

(21) Appl. No.: 17/810,039

(22) Filed: Jun. 30, 2022

(65) Prior Publication Data

US 2023/0010590 A1   Jan. 12, 2023

(30) Foreign Application Priority Data

Jul. 7, 2021 (EP) .................................... 21184284

(51) Int. Cl.
*H01H 1/021* (2006.01)

(52) U.S. Cl.
CPC .................................. *H01H 1/021* (2013.01)

(58) Field of Classification Search
CPC .... H01H 1/021; H01H 2003/326; H01H 3/62; H01H 1/60; H01H 1/027; H01H 2300/036; C09K 2208/10; C09K 8/58; C09K 8/92; C09K 8/524; C09K 8/536; C09K 8/592; C09K 8/594; C09K 8/70; C09K 8/74
See application file for complete search history.

(56) References Cited

U.S. PATENT DOCUMENTS

| | | | | |
|---|---|---|---|---|
| 2014/0374267 A1* | 12/2014 | Monteiro | ................. | C25D 9/04 |
| | | | | 205/104 |
| 2020/0152399 A1* | 5/2020 | Andersson | ............ | B22F 1/0545 |

FOREIGN PATENT DOCUMENTS

| | | |
|---|---|---|
| CN | 103556138 A | 2/2014 |
| CN | 103695877 A | 4/2014 |
| CN | 104846418 A | 8/2015 |
| CN | 105537877 A | 5/2016 |
| CN | 105765246 A | 7/2016 |
| CN | 106319582 A | 1/2017 |
| CN | 106350857 A | 1/2017 |
| CN | 106367781 A | 2/2017 |
| CN | 106381509 A | 2/2017 |
| CN | 106555146 A | 4/2017 |
| CN | 106567120 A | 4/2017 |
| CN | 106567121 A | 4/2017 |
| CN | 106740291 A | 5/2017 |

(Continued)

OTHER PUBLICATIONS

De Mello, Biasoli, et al.; "Tribological behaviour of sintered iron based self-lubricating composites" ; Whirlpool, Embraco Unit, Friction vol. 5; Issue 3; Springer; Brazil; Sep. 2017; 23 Pages.

(Continued)

*Primary Examiner* — Ahmed M Saeed
(74) *Attorney, Agent, or Firm* — Whitmyer IP Group LLC

(57) ABSTRACT

A mechanism for an electrical device, including a plurality of metal parts which are not arranged for conducting an electrical current of which a first part includes a first contact surface and a second part includes a second contact surface arranged to move in relation to, and in contact with, the first contact surface. At least one of the first and second parts includes a Graphene and Related Materials (GRM) at its contact surface, in a metal-GRM composite.

19 Claims, 1 Drawing Sheet

(56) References Cited

FOREIGN PATENT DOCUMENTS

| CN | 106756905 A | 5/2017 |
|---|---|---|
| CN | 107142407 A | 9/2017 |
| CN | 107267791 A | 10/2017 |
| CN | 107630244 A | 1/2018 |
| CN | 107815720 A | 3/2018 |
| CN | 104681321 B | 4/2018 |
| CN | 108396166 A | 8/2018 |
| CN | 108588458 A | 9/2018 |
| CN | 109112336 A | 1/2019 |
| CN | 109439965 A | 3/2019 |
| CN | 109705952 A | 5/2019 |
| CN | 110126378 A | 8/2019 |
| CN | 110172629 A | 8/2019 |
| CN | 110331318 A | 10/2019 |
| EP | 807949 A2 | 11/1997 |
| EP | 807949 A3 | 3/1999 |
| EP | 3388168 A1 | 10/2018 |
| WO | 2014205330 A1 | 12/2014 |

OTHER PUBLICATIONS

Kasar, A.K., et al.; "Synthesis and recent advances in tribological applications of graphene"; International Journal of Advanced Manufacturing Technology, vol. 97; Reno, NV, USA; Published: Jun. 5, 2018; Issued: Aug. 2018; 21 Pages.

Extended European Search Report; Application No. 21184284.4; Completed: Dec. 6, 2021; Issued: Dec. 14, 2021; 6 Pages.

Lei, Yu, et al.; "Effect of Counterparts and Applied Load on the Tribological Behavior of the Graphene-Nickel Matrix Self-Lubricating Composite"; School of Mechanics and Engineering Science, Journal of the Electrochemical Society 2018, vol. 165, No. 5; Zhengzhou, China; Sep. 12, 2018; 10 Pages.

\* cited by examiner

MECHANISM FOR ELECTRICAL DEVICE

TECHNICAL FIELD

The present disclosure relates to a metal mechanism for an electrical device, e.g. switchgear or controlgear, in which mechanism different metal parts move in relation to, and in contact with, each other, e.g. by rolling or sliding.

BACKGROUND

For electrical switching apparatuses in general, the mechanical drive system relies on lubrication with grease. The grease lowers the friction in the mechanical system as well as minimizes the mechanical wear. However, there are drawbacks such as limited temperature range, degradation of the grease due to particle pollution, and thickening of the grease due to aging or low temperatures, leading to a need for regular maintenance and regreasing. Also, thickening of the grease may lead to an increase in static friction and potentially increased operation time, which could have large effect on the switching performance. In the worst case, failure of lubrication can lead to complete blockage of the function of the switching device, which could have very large and costly consequences.

SUMMARY

It is an objective of the present invention to provide an improved metal mechanism, e.g. drive and/or actuator, typically for an electrical device, such as a switchgear and/or controlgear, with reduced maintenance need compared to greased mechanisms.

According to an aspect of the present invention, there is provided a mechanism for an electrical device. The mechanism comprises a plurality of metal parts which are not arranged for conducting an electrical current. Of said metal parts, a first part comprises a first contact surface and a second part comprises a second contact surface, which second contact surface is arranged to move in relation to, and in contact with, the first contact surface. At least one of the first and second parts comprises a Graphene and Related Materials (GRM) at its contact surface, in a metal-GRM composite.

According to another aspect of the present invention, there is provided an electrical device, e.g. a switchgear and/or controlgear, comprising an electrical conductor and an embodiment of the mechanism of the present disclosure.

By means of the GRM in or at the first and/or second contact surface(s), dry lubrication is provided, reducing, or eliminating the need for lubrication maintenance during the lifetime of the mechanism. Also, by eliminating the need for grease, the lubrication and lubricating effect can be more stable over time and resistant to e.g., high or low temperatures, and dust or other pollutants. The corrosion resistance of the metal part may also be improved by the GRM.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In accordance with the present invention, a metal-GRM composite is used. Graphene and Related Materials (GRM) include graphene (G), graphene oxide (GO), reduced GO (rGO) and any combination thereof. Thus, when GRM is mentioned herein, any such material is covered by the term. The GRM could be applied in different forms, e.g. as a composite metal-GRM coating, for instance applied directly on a metal surface, e.g. by electroplating or by thermal or cold spraying, or as a metal-GRM bulk composite. Currently preferred solutions include a steel-GRM bulk composite or a nickel-GRM composite coating.

The terms "switchgear" and "controlgear" used herein generally cover electrical switching devices and their associated equipment. The terms may often be used interchangeably, but typically a switchgear is used to protect the transmission and/or distribution network while a controlgear is used in industrial networks as well as in buildings etc.

Similarly, the terms "drive" and "actuator" may often be used interchangeably, but one of the terms may be preferred depending on the technical application it is used for.

Figure 1:
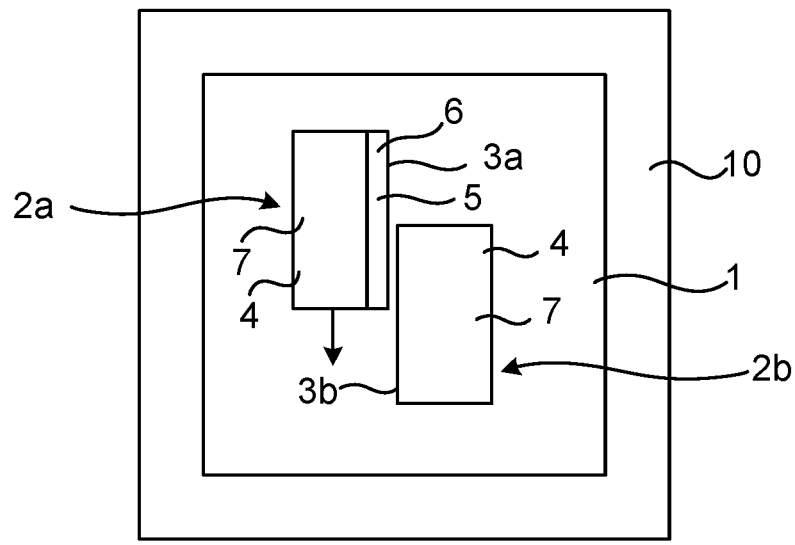
FIG. 1 is a schematic block diagram of an electrical device and drive mechanism thereof, in accordance with some embodiments of the present invention.

FIG. 1 illustrates an electrical device 10, e.g. a switchgear and/or a control gear, comprising a mechanical mechanism 1, e.g. a drive and/or an actuator, or a joint which may or may not be part of a drive or actuator, e.g. a pin joint. The mechanism may e.g., be arranged for operating an electrical switch. The mechanism 1 may be actuated in any conventional way, e.g. spring, magnetically or pneumatically actuated. The mechanism 1 comprises a plurality of parts 2 which are arranged to move in relation to each other during operation of the mechanism. The mechanism 1 is typically a metal mechanism, implying that at least the core 4 of each of the parts 2 is of a metallic material. For two parts 2 which are arranged to move in relation to, and in contact with, each other, each comprises a contact surface 3 for making contact with the corresponding contact surface 3 of the other part 2. At least one contact surface 3 of at least one part 2 of the mechanism 1 is of a metal-GRM composite which is arranged to act as a dry lubricant.

In some embodiments of the present invention, the metal-GRM composite is a bulk material 7 of the metal part 2. This implies that the core 7 is made on the metal-GRM composite providing the contact surface or the metal-GRM composite. Alternatively, in some other embodiments, the metal-GRM composite providing the contact surface 3 is an addition 5 attached to the core 4, then e.g. of a steel material 7 without any GRM, of the metal part 2, e.g. as a coating or insert. Thus, the metal-GRM composite providing the contact surface 3 may be present in the part 2 either as the material 7 of the core 4 or as the material 6 of the addition 5.

In the example of FIG. 1, two parts 2 of the drive 1 are shown, a first part 2a and a second part 2b, each comprising a contact surface 3. The first part 2a comprises a first contact surface 3a arranged to move (as indicated by the downward pointing arrow in the figure) in relation to, and in contact with, a second contact surface 3b of the second part 2b. Each of the first and second parts 2a and 2b comprises a metal core 4. The first contact surface 3a is provided by an addition 5 of a metal-GRM material 6 applied directly or indirectly on the core 4, e.g. of a metallic material 7. The second contact surface 3b is provided by the core 4 of the second part 2b, typically of a metallic material 7. In some embodiments, the metallic material 7 also is a metal-GRM composite, whereby both the first and second contact surfaces 3a and 3b are provided by a metal-GRM composite 6 and 7, or it may be enough with only one of the first and second contact surfaces being provided by a metal-GRM composite, in which case the metallic material 7 of the core 4 of the second part 2b may be steel without any GRM. Alternatively, if it is desired that both the first and second contact surfaces 3a and 3b are provided by a metal-GRM composite, an addition 5 of a metal-GRM composite 6 may be attached also to the core 4 of the second part 2b.

If more than one contact surface 3, e.g. both the first and second contact surfaces 3a and 3b, in the mechanism 1 are provided by a metal-GRM composite 6 or 7, they may conveniently have the same composite composition. However, depending on the place, operating conditions (e.g., temperature or pressure) and function of the contact surface 3, it may in some embodiments be advantageous to use respective different composite compositions for different contact surfaces 3 within the same mechanism 1. The mechanism 1 may have any number of parts 2 and any number of pairs of contact surfaces 3 arranged to move in relation to, and in contact with, each other. In any of these pairs, at least one of the contact surfaces 3 may be provided by a metal-GRM composite 6 or 7 as discussed herein. In case there is more than one pair of contact surfaces in the mechanism which are provided with a metal-GRM composite, the composition may be the same for all metal-GRM composites, e.g. for simplifying the manufacture of the mechanism 1, or the metal-GRM composite 6 or 7 of at least one of the surfaces 3 may be different from at least one other of the surfaces 3. The use of different composite compositions 6 and/or 7 allows the composite material to be selected depending on the particular requirements on each contact surface, e.g. depending on the pressure, movement and/or temperature the contact surface is intended for.

That a contact surface 3 has an addition 5 implies that the contact surface is (at least partly) provided by the addition, since the addition 5 provides an outermost surface of the part 2, which then becomes the contact surface 3. In some embodiments, the part 2 is provided with an addition 5 only where it is arranged to contact another part 2 of the mechanism 1. Alternatively, in some other embodiments, the part 2 is provided with an addition 5, e.g. coating, also on other surfaces, the metal core 4 being partly or fully enclosed by the addition 5.

Any addition 5 may be a coating, applied directly or indirectly onto a core 4 of a part 2. The coating may be applied by electroplating or by spray coating, e.g. thermal or cold spraying. The coating may have a thickness within the range of 1 μm to 5 mm. When electroplating is used, the thickness is typically within the range of 1-50 μm, preferably 5-20 μm, while when spray coating is used, the thickness is typically within the range of 0.1-5 mm, preferably 0.2-3 mm.

Alternatively, any addition 5 may be an insert fastened to the core 4, e.g. by welding and/or riveting. The insert may in some embodiments have a thickness within the range of 1-5 mm.

In some embodiments of the present invention, the metal of the metal-GRM composite 6 and/or 7 comprises or consists of copper, nickel, chromium, silver and/or steel, e.g. stainless steel, high-strength steel or low carbon steel. If the metal-GRM composite 6 is in the form of an addition 5, the metal may suitably be copper and/or nickel, forming a copper and/or nickel GRM composite 6. If the metal-GRM composite is in the form of a bulk material 7 of a core 4, the metal may suitably be steel, e.g. stainless steel, high-strength steel or low carbon steel, and/or a nickel and/or chromium alloy.

In some embodiments of the present invention, the GRM of the metal-GRM composite 6 and/or 7 is any of graphene (G), graphene oxide (GO), and/or reduced GO (rGO). Typically, the metal-GRM composite 6 and/or 7 has a GRM content within the range of 0.1-10 wt %, preferably within the range of 0.1-1 wt %.

In some embodiments of the present invention, the first contact surface 3a is arranged to move in relation to the second contact surface 3b by sliding or rolling, e.g. by sliding against the second contact surface. The same could apply for any further contact surface pairs in the mechanism 1. Examples of rolling contact may be in a pin joint, e.g. where the pin is coated with the metal-GRM composite 6. Other examples of parts 2 include e.g. a spring actuator, or any part 2 arranged to be moved by an actuator e.g. a spring, magnetic or pneumatic actuator, in the mechanism 1.

In some embodiments of the present invention, any of the respective metal cores 4 of the mechanism 1, e.g. the metal core 4a of the first part 2a and/or the metal core 4b of the second part 2b are of made of steel. Steel can provide the strength and durability desired for the mechanism 1. In case the part 2 is in the form of, or part of, a spring, the core 4 may be made of a spring steel.

Figure 2:
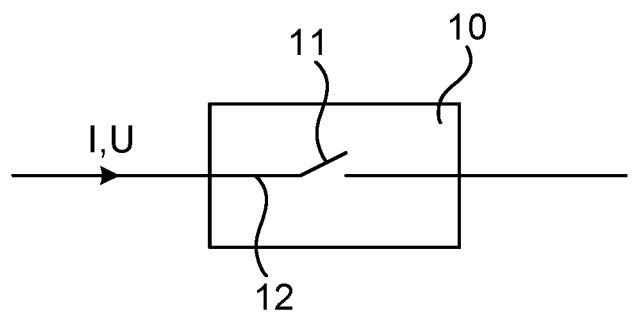
FIG. 2 is a schematic circuit diagram of an electrical device, in accordance with some embodiments of the present invention.

FIG. 2 illustrates an electrical device 10, e.g. a switchgear and/or controlgear, comprising an electrical switch 11 for switching an electrical current I having the voltage U and being conducted by the electrical conductor 12. The electrical device 10 thus comprises the mechanism 1 discussed above, as well as the switch 11 (and possibly further switches 11) and the conductor 12 (and possibly further conductors 12). The electrical device 10 may be any switchgear or controlgear configured for breaking or switching a current I by means of the at least one switch 11 and/or conducting the current I by means of the at least one electrical conductor 12. The electrical device 10 may e.g., be configured for breaking or switching a current I having a voltage within the low-voltage range of at most 1 kV, e.g.

within the range of 0.01-1 kV, or the medium voltage range, e.g. within the range of 1-52 kV.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A mechanism for an electrical device, comprising:
a plurality of metal parts which are not arranged for conducting an electrical current of which a first part includes a first contact surface and a second part includes a second contact surface arranged to move in relation to, and in contact with, the first contact surface;
wherein at least one of the first and second parts comprises a Graphene and Related Materials, GRM, at its contact surface, in a metal-GRM composite.

2. The mechanism of claim 1, wherein the metal-GRM composite is a bulk material of the metal part.

3. The mechanism of claim 2, wherein the metal-GRM composite is a steel-GRM bulk material.

4. The mechanism of claim 1, wherein the metal-GRM composite is a coating on a core of the metal part.

5. The mechanism of claim 4, wherein the coating has a thickness within the range of 1-50 μm or 0.1-5 mm.

6. The mechanism of claim 4, wherein the metal-GRM composite is a nickel-GRM coating.

7. The mechanism of claim 1, wherein the metal-GRM composite is an insert fastened to a core of the metal part.

8. The mechanism of claim 7, wherein the insert is fastened by welding or riveting.

9. The mechanism of claim 1, wherein the GRM of the metal-GRM composite is any of graphene, G, graphene oxide, GO, and/or reduced GO, rGO.

10. The mechanism of claim 1, wherein the metal of the metal-GRM composite includes copper, nickel, chromium, silver, and/or steel.

11. The mechanism of claim 10, wherein the metal of the metal-GRM composite is copper, nickel, chromium, silver, and/or steel.

12. The mechanism of claim 1, wherein the metal-GRM composite has a GRM content within the range of 0.1-10 wt %.

13. The mechanism of claim 1, wherein the mechanism is an actuator, drive, or mechanical joint.

14. The mechanism of claim 10, wherein the steel is stainless steel, high-strength steel, or low carbon steel.

15. The mechanism of claim 12, wherein the metal-GRM composite has a GRM content within the range of 0.1-1 wt %.

16. The mechanism of claim 13, wherein the mechanical joint is a pin joint for a switchgear or controlgear.

17. An electrical device comprising:
an electrical conductor, and
a mechanism having a plurality of metal parts which are not arranged for conducting an electrical current of which a first part includes a first contact surface and a second part includes a second contact surface arranged to move in relation to, and in contact with, the first contact surface;
wherein at least one of the first and second parts comprises a Graphene and Related Materials, GRM, at its contact surface, in a metal-GRM composite.

18. The electrical device of claim 17, wherein the electrical device is a switchgear and/or controlgear including an electrical switch.

19. The electrical device of claim 18, wherein the electrical switch is a circuit breaker or contactor.

* * * * *